UNITED STATES PATENT OFFICE.

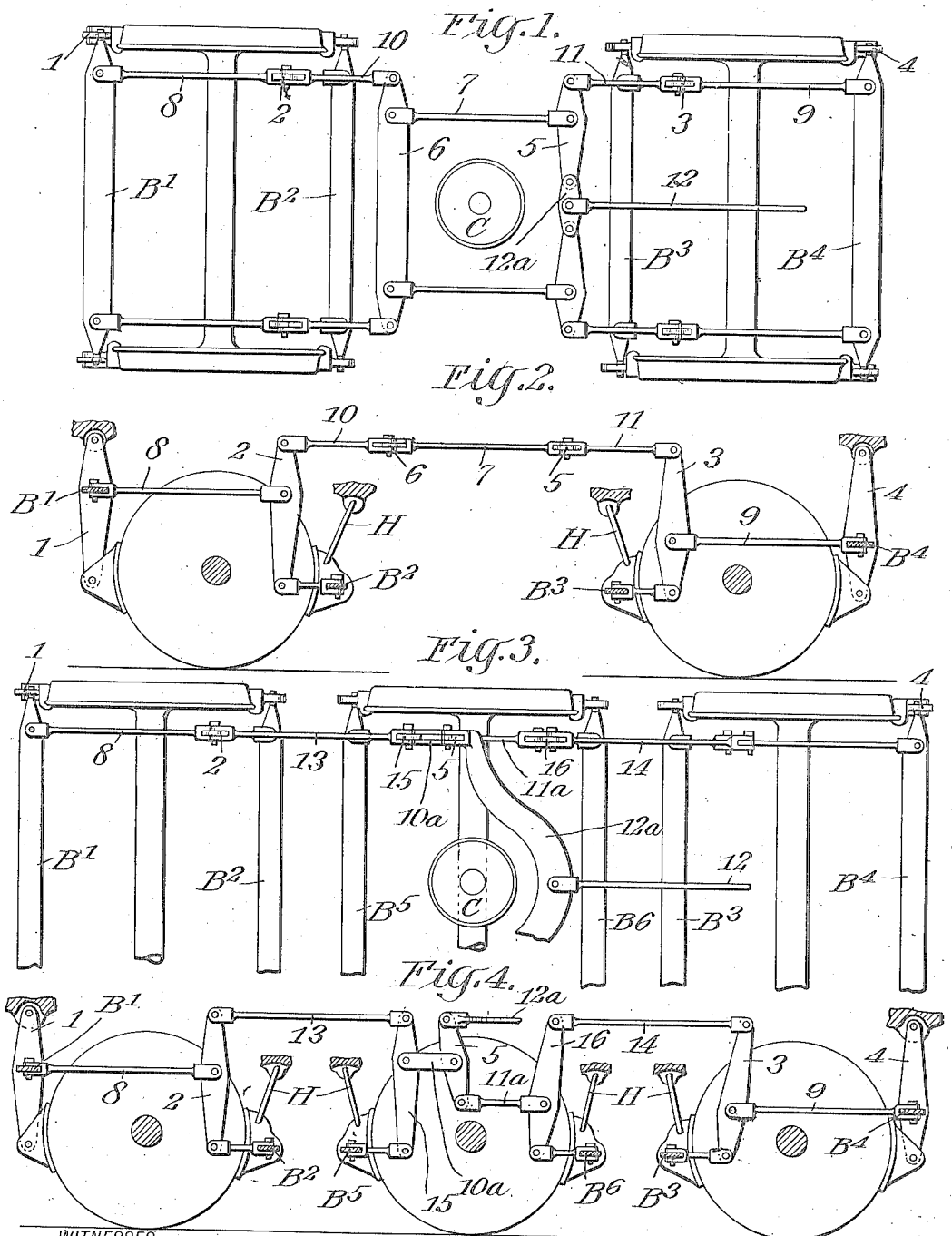

THOMAS L. BURTON, OF PITTSBURGH, PENNSYLVANIA, ASSIGNOR, BY MESNE ASSIGNMENTS, TO AMERICAN BRAKE COMPANY, OF ST. LOUIS, MISSOURI, A CORPORATION OF MISSOURI.

BRAKE-RIGGING.

1,166,177.

Specification of Letters Patent. Patented Dec. 28, 1915.

Application filed August 27, 1913. Serial No. 786,838.

*To all whom it may concern:*

Be it known that I, THOMAS L. BURTON, a citizen of the United States, residing at Pittsburgh, in the county of Allegheny and State of Pennsylvania, have invented a certain new and useful Improvement in Brake-Rigging, of which improvement the following is a specification.

This invention relates to railway brake rigging of the clasp type, in which brake shoes are applied to both sides of each pair of truck wheels.

The principal object of my invention is to provide an improved construction of this type in which a double set of truck levers and rods are employed, one at each side of the truck, and having an intermediate floating lever located near the center of the truck for each of the two sets of truck rods and levers. The power from the brake cylinder is applied to both of said intermediate floating levers and from them is transmitted in opposite directions, directly to the respective truck levers, the leverage of which is designed to transmit substantially equalized pressure to all of the brake shoes.

In the accompanying drawings: Figure 1 is a plan of one form of clasp type brake applied to a four wheeled truck, and embodying my improvement; Fig. 2, a longitudinal sectional view of the same, showing one set of truck rods and levers in elevation; Fig. 3, a half plan; and Fig. 4, a sectional view showing a modification as applied to a six wheeled truck.

My improvement is especially adapted for use in connection with pivoted trucks having a plurality of pairs of wheels, usually four or six, employed at both ends of the car, and having brake shoes applied to both sides of each pair of wheels.

According to the construction shown in Figs. 1 and 2 of the drawings, the improvement is applied to a four wheeled truck having brake beams, B¹, B², B³ and B⁴, at both sides of each pair of wheels, and two sets of truck levers, 1, 2, 3, and 4, with coupling rods, 8 and 9, these parts being duplicated upon opposite sides of the truck. The live truck levers, 2 and 3, are pivotally connected at their lower ends to the brake beams, B² and B³, having brake shoes at their ends, supported by hangers, H, while the dead truck levers, 1 and 4, are pivotally connected to the respective brake beams, B¹ and B⁴, and carry brake shoes at their lower ends.

According to my present improvement, the stresses from the intermediate floating lever 5, are transmitted in opposite directions directly to the truck levers through uniform stress connections respectively, as for instance in Figs. 1 and 2, the pull rod 11, connects the end of lever, 5, with the upper end of truck lever, 3, while the stress in the opposite direction is transmitted directly through rods, 7 and 10, to the truck lever, 2. These pull rods, 7 and 10, may be regarded as two sections of single uniform stress connections, since the cross bar, 6, is interposed merely for the purpose of making an offset into the plane of the vertical truck lever, 2, and avoid locating the rods at an angle to the longitudinal lines of the truck. It will be evident that the same result may be accomplished and the bar, 6, be eliminated, by shifting the truck lever, 2, into the same plane with the pull rod, 7.

The stresses transmitted from the floating lever, 5, by the respective rods, 7 and 11, will, of course, be unequal, since the leverage is different, and in order to compensate for the inequality of stress, the leverage of the truck levers, 3 and 4, in one direction is different from that of the truck levers, 2 and 1, in the opposite direction, the leverage of said truck levers being so calculated as to produce a substantially equalized braking pressure upon all the brake shoes.

As shown in Figs. 1 and 2, the intermediate levers, 5, which are located near the center plate, C, of the truck, are substantially horizontal, and the power from the brake cylinder is applied by means of pull rod, 12, and equalizer, 12ª, connected to the inner ends of the floating levers, 5.

In Figs. 3 and 4, I have shown my improvement applied to a six wheeled truck, and the arrangement of intermediate floating levers, 5, is similar to that of Fig. 1, except that these levers are located vertically at each side of the truck, and said levers are coupled by means of the respective oppositely extending links, 10ª, and 11ª, directly with the truck levers, 15 and 16, which are pivotally connected at their lower ends to the respective brake beams, B⁵ and B⁶, on opposite sides of the center pair of wheels. The upper ends of the center truck levers, 15 and 16, are connected by the rods 13 and 14, respectively, with the live truck levers, 2, and 3, of the end pairs of wheels, which are substantially the same as in the four wheeled truck construction. It will be noted that the truck levers upon one side of the floating lever, 5, have a different leverage from those on the other side, in order to compensate for the difference in the stresses transmitted in the rods, 10ª and 11ª, and thereby produce an equalized braking pressure. The brake shoes for all intermediate brake beams, B², B⁵, B⁶, and B³, are supported by hangers, H, while the combined lever and hanger is employed at the end or dead truck levers, 1 and 4, as before described.

In all of these modifications, it will now be seen that the power from the brake cylinder pull rod is applied to an intermediate floating lever located near the center of the truck, and having connections for transmitting the stresses in opposite directions, directly to the respective truck levers, the leverage of the latter being calculated to produce an equalized pressure upon all of the brake shoes.

Having now described my invention, what I claim as new and desire to secure by Letters Patent is:—

1. In a brake rigging for pivoted trucks having a plurality of pairs of wheels, the combination with brake shoes applied to both sides of each pair of wheels and a double set of truck levers and rods, one set at each side of the truck, of an intermediate floating lever upon each side of the truck, and having the respective uniform stress connections extending in opposite directions direct to the truck levers.

2. In a brake rigging for pivoted trucks having a plurality of pairs of wheels, the combination with brake beams applied to both sides of each pair of wheels, and a set of truck levers and rods connected to said brake beams upon each side of the truck, of an intermediate floating lever having a rod connection of uniform stress extending in one direction directly to one truck lever and another rod connection of uniform stress extending on the opposite direction directly to another truck lever, and a brake cylinder pull rod for operating said intermediate lever.

3. In a brake rigging for pivoted trucks having a plurality of pairs of wheels, the combination with brake beams applied to both sides of each pair of wheels, and a set of truck levers and rods connected to said brake beams upon each side of the truck, of an intermediate floating lever having a rod connected directly to a truck lever toward one end of the truck, and another rod connection of uniform stress extending directly to another truck lever toward the other end of the truck, said truck levers having a different leverage for producing substantially equalized braking pressure.

4. In a brake rigging for pivoted trucks having a plurality of pairs of wheels, the combination with brake beams applied to both sides of each pair of wheels, and a set of truck levers and rods connected to said brake beams upon each side of the truck, of an intermediate floating lever for each set of truck levers, and having the respective rod connections of uniform stress extending in opposite directions to two different truck levers, and a brake cylinder pull rod with an equalizer connected to said intermediate floating levers.

THOMAS L. BURTON.

Witnesses:
J. SNOWDEN BELL,
EDWARD A. WRIGHT.